W. P. FITZGERALD.
AUTO ANTIRATTLER.
APPLICATION FILED JAN. 7, 1914.
1,121,818.  Patented Dec. 22, 1914.
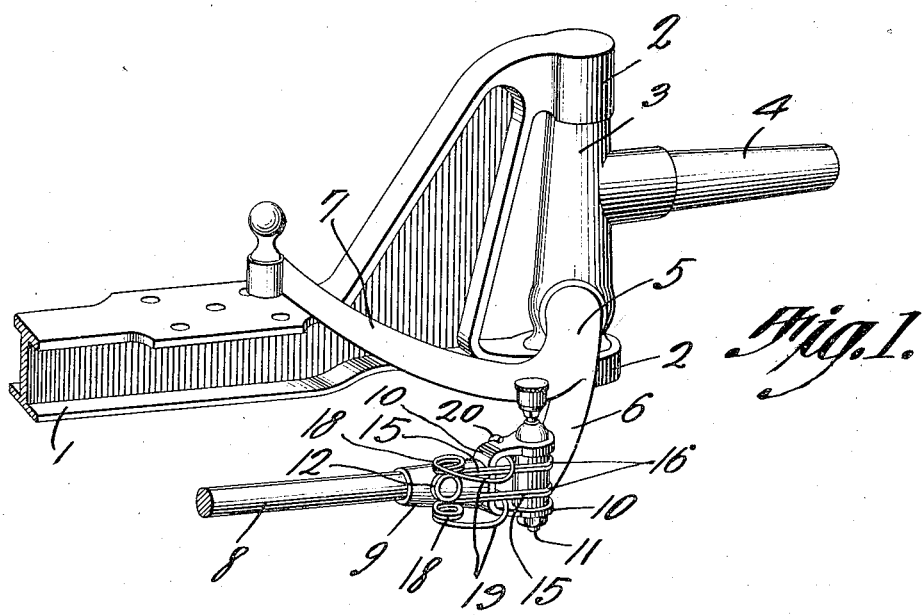
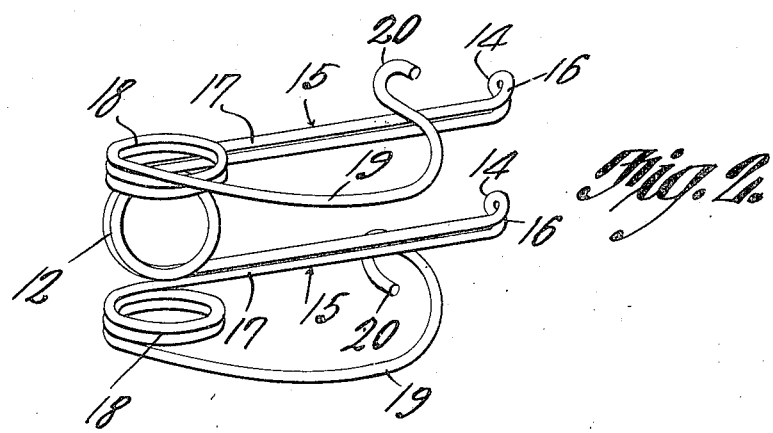
Witnesses
William P. Fitzgerald
Inventor
by
Attorneys

UNITED STATES PATENT OFFICE.

WILLIAM P. FITZGERALD, OF PRINCESS ANNE, MARYLAND, ASSIGNOR OF ONE-THIRD TO JOSEPH W. COLEBURN AND ONE-THIRD TO EARLY B. COLEBURN, BOTH OF CAPE CHARLES, VIRGINIA.

AUTO-ANTIRATTLER.

1,121,818.  Specification of Letters Patent.  Patented Dec. 22, 1914.

Application filed January 7, 1914. Serial No. 810,837.

*To all whom it may concern:*

Be it known that I, WILLIAM P. FITZGERALD, a citizen of the United States, residing at Princess Anne, in the county of Somerset and State of Maryland, have invented a new and useful Auto-Antirattler, of which the following is a specification.

This invention aims to provide a device which is adapted to be assembled with the steering knuckle and the drag link of a vehicle to prevent undue wear, rattling and lost motion between the above specified parts.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawing:—Figure 1 shows the invention in perspective assembled with the steering knuckle and the drag link of a vehicle; Fig. 2 is a perspective showing the device detached.

In the drawings the numeral 1 indicates the axle of a vehicle provided with bearings 2 in which is journaled an upright shaft 3 carrying a stub axle 4 upon which the ground wheel (not shown) is mounted. Projecting from the shaft 3 is an arm 5 terminated in a finger 6 and in an angularly disposed finger 7, the finger 7 being adapted to be operatively connected with the steering wheel (not shown).

The foregoing constitutes a part of a standard automobile construction and is delineated and described merely for the purpose of illustrating the application of the invention.

The drag link is shown at 8 and terminates in a socket 9 having arms 10 lying upon opposite sides of the finger 6. Through the arms 10 passes a pivot element 11, engaged with the extremity of the finger 6, the foregoing construction being common and well understood by those skilled in the art.

Referring to Fig. 2 there is shown a spring which is formed from a single strip of resilient material bent upon itself to form a primary coiled spring 12, the ends of the primary spring 12 being prolonged and bent upon themselves as at 14 to form a pair of two-part main arms 15 lying in a common plane with the primary spring 12, the extremities of the main arms 15 being curved to form hooks 16, one part 17 of each main arm 15 being bent upon itself to form a coiled secondary spring 18, the secondary springs lying approximately at right angles to the plane of the main arms 15 and the primary spring 12, the extremity of each secondary spring 18 being prolonged to form an auxiliary arm 19, the auxiliary arms being arched away from the plane defined by the main arms 15 and terminating in hooks 20 which lie outside of the main arms 15.

In practical operation, as shown in Fig. 1, the hooks 16 are engaged with the pivot element 11 and the primary coiled spring 12 lies in abutment with the drag link 8. The auxiliary arms 19 extend transversely of the arms 10 of the steering rod 8 and pass therebetween, the hooks 20 being engaged with the edges of the arms 10 upon the opposite side of the pivot element 11 from that engaged by the hooks 16. The primary coiled spring 12 serves to maintain the main arms 15 in approximate parallelism, but owing to the presence of the spring 12, the free ends of the arms 15 may be compressed, permitting the auxiliary arms 19 to be passed between the parts 10 of the rod 8. Thereafter, the main arms 15 will move into approximate parallelism, as shown in Fig. 1 and, coacting with the auxiliary arms 19, will aid in maintaining the hooks 20 engaged with the parts 10 of the drag link 8.

The spring structure herein disclosed exerts pressures in opposite directions upon the pivot element 11 and the drag link 8 in a direction at right angles to the axis of the pivot element 11, and thus undue wear and rattling will be prevented between the steering rod and the steering knuckle.

Having thus described the invention, what is claimed is:—

1. The combination with the steering knuckle of a vehicle, the drag link and a pivot element connecting the link and the knuckle, of a spring comprising arms, one of which arms extends longitudinally of the link and engages the pivot element, the other of which arms extends transversely of the link and is terminally engaged with the link.

2. The combination with the steering knuckle of a vehicle, the drag link and a pivot element connecting the link and the knuckle, of a spring comprising main arms, each engaged at its outer end with the pivot element, the main arms being connected at their inner ends by a coiled spring which bears against the link, the inner ends of the main arms being provided with coiled springs which are prolonged to form auxiliary arms, the auxiliary arms engaging the link adjacent the pivot element.

3. In a device of the class described, a steering knuckle; a drag link having bifurcations spanning the knuckle; a pivot element connecting the bifurcations with the knuckle; and a spring comprising compressible main arms engaging the pivot element and auxiliary arms terminally engaged with the bifurcations of the drag link and lying between the main arms and the bifurcations of the drag link.

4. In a device of the class described, a spring formed from a single strip of resilient material bent upon itself to form a primary coiled spring, the ends of the primary spring being prolonged and bent upon themselves to form a pair of two-part main arms lying in a common plane with the primary spring, one part of each main arm being bent upon itself to form a coiled secondary spring, the secondary springs lying at an angle to the plane of the main arms and the primary spring, the extremities of the secondary springs being prolonged to form auxiliary arms, the auxiliary arms being arched away from the plane defined by the main arms and terminating in hooks which lie outside of the main arms.

In testimony that I claim the foregoing as my own, I have hereto affixed my signature in the presence of two witnesses.

WILLIAM P. FITZGERALD.

Witnesses:
SELINA WILLSON,
I. E. SIMPSON.